(12) United States Patent
Persson

(10) Patent No.: US 8,297,794 B2
(45) Date of Patent: Oct. 30, 2012

(54) METHOD FOR DIRECTING LIGHT IN A FLUORESCENT PIECE

(76) Inventor: Kurt Persson, Koping (SE)

( * ) Notice: Subject to any disclaimer, the term of this patent is extended or adjusted under 35 U.S.C. 154(b) by 437 days.

(21) Appl. No.: 12/530,623

(22) PCT Filed: Jul. 28, 2009

(86) PCT No.: PCT/US2009/051890
§ 371 (c)(1),
(2), (4) Date: Sep. 9, 2009

(87) PCT Pub. No.: WO2010/014564
PCT Pub. Date: Feb. 4, 2010

(65) Prior Publication Data
US 2011/0310612 A1    Dec. 22, 2011

Related U.S. Application Data

(60) Provisional application No. 61/084,831, filed on Jul. 30, 2008.

(51) Int. Cl.
*F21V 23/02*    (2006.01)
(52) U.S. Cl. .............. 362/260; 362/217.08; 362/224; 362/84; 362/614
(58) Field of Classification Search ............ 362/217.08, 362/614, 217.01, 224, 217.02, 217.03, 217.09, 362/260, 84
See application file for complete search history.

(56) References Cited

U.S. PATENT DOCUMENTS

| | | | | |
|---|---|---|---|---|
| 3,152,277 | A * | 10/1964 | Cutler et al. ............... | 362/260 |
| 5,779,337 | A * | 7/1998 | Saito et al. ................. | 362/619 |
| 6,196,691 | B1 * | 3/2001 | Ochiai ....................... | 362/617 |
| 6,241,358 | B1 * | 6/2001 | Higuchi et al. ............. | 362/613 |
| 2007/0058393 | A1 * | 3/2007 | Kim et al. ................... | 362/613 |
| 2007/0086184 | A1 * | 4/2007 | Pugh et al. ................. | 362/231 |

FOREIGN PATENT DOCUMENTS

WO    2008072990    6/2008

* cited by examiner

*Primary Examiner* — Danielle Allen
(74) *Attorney, Agent, or Firm* — Fasth Law Offices; Rolf Fasth

(57) ABSTRACT

The method is for directing light in a fluorescent piece. Sequentially placed wedge-shaped pieces form a multiple-piece arrangement. Each piece has a base surface and a sloping top surface so that there is a first pointed end at one end and a short end surface at a second opposite end thereof. The pieces are exposed to light beams that hit fluorescent particles disposed inside the pieces. As a result, the particles emit a fluorescent light that are reflected off the inner surfaces of each piece as long as the light beams do not hit the surface at a perpendicular angle. The light beams are directed to penetrate the short end of each piece to form a continuous illuminated surface.

8 Claims, 1 Drawing Sheet

METHOD FOR DIRECTING LIGHT IN A FLUORESCENT PIECE

PRIOR APPLICATION

This application is a U.S. national phase application based on International Application No. PCT/US2009/51890, filed 28 Jul. 2009 that claims priority from U.S. provisional patent application No. 61/084,831, filed 30 Jul. 2008.

TECHNICAL FIELD

The method relates to a method for directing light in a fluorescent piece.

BACKGROUND OF INVENTION

Fluorescent light and fluorescent particles that take advantage of the fiber-optical characteristics have been used inside plastics before. However, the fluorescent light has been emitted in all direction and the main purpose has often been for the fluorescent piece to be visible so the more directions of emitted light the better. However, fluorescent pieces may find new applications by directing the light in only certain directions such as only in one direction. There is a need for transporting the light in only one direction and preventing or reducing the light from being emitted in any other direction to strengthen the intensity of the emitted monochrome light.

SUMMARY OF INVENTION

The method of the present invention provides a solution to the above-outlined problems. More particularly, the method is for directing light in fluorescent pieces. Sequentially placed wedge-shaped pieces form a multiple-piece arrangement. Each piece has a base surface and a sloping top surface so that there is a first pointed end at one end and a short end surface at a second opposite end thereof. The pieces are exposed to light beams that hit fluorescent particles disposed inside the pieces. As a result, the particles emit a monochrome fluorescent light that are reflected off the inner surfaces of each piece as long as the light beams do not hit the inner surfaces at a perpendicular angle. The monochrome light beams are directed towards the short ends of each piece at a perpendicular angle thereto to penetrate the short ends of each piece to form a continuous illuminated surface.

DETAILED DESCRIPTION

Figure 1:
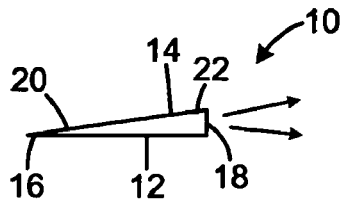
FIG. 1 is a side view of a fluorescent piece according to the present invention.
Figure 2:
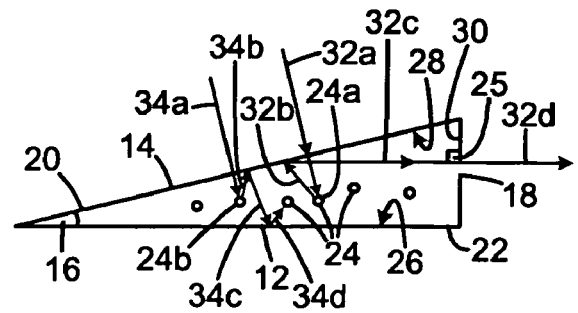
FIG. 2 is an enlarged detailed side view of the fluorescent piece shown in FIG. 1.

As best shown in FIG. 1-2, the fluorescent piece 10 of the present invention is preferably wedge-shaped so that it has a horizontal base surface .12 and a sloping top surface 14 that forms an acute angle 16 relative to the base surface 12 and at a first pointed end 20 and a perpendicular or vertical short end surface 18 at a second end 22 that is opposite to the first pointed end 20.

Preferably, the piece 10 may be made from any suitable material such as acrylic plastics (PMMA) that contains fluorescent particles or substances 24 that are evenly distributed inside the piece 10. The particles emit monochrome light when hit by light beams. The amount of particles 24 added to the piece may determine the intensity of the monochrome light emitted. The particles may be designed to emit monochrome light in any color such as red, yellow, green or orange. The base surface 12, the top surface 14 and the end surface 20 are constructed of a material that only permit monochrome light to pass therethrough when the light is transmitted at a perpendicular angle 25 or at an angle greater than 60-70° relative to the surfaces 12, 14 and 20. In other words, since the refraction index between plastics and air are different the monochrome light traveling inside the plastic piece will bounce back into the plastic piece when the monochrome light beam hits one of the inside surfaces of the plastic piece at an angle. In this way, the inside surfaces 26, 28 and 30 act as mirrors for any monochrome light beam that is emitted by the substances 24 towards the inside surfaces 26, 28, 30 at any other angle than the perpendicular angle or angles greater than 60-70°. For example, an incoming light beam 32a hits a particle 24a that emits monochrome light beams all around the substance 24a in 360° of which one of the beams is a monochrome light beam 32b that is directed into the inner surface 28. The monochrome light beam 32b is reflected by the inner surface 28 as a reflective light beam 32c that is then transmitted towards the inner surface 30. Because the reflective beam 32c hits the inner surface 30 at the perpendicular angle 25 or at an angle close to 90° relative to the inner surface 30, the beam 32c penetrates through the surface 18 as a monochrome light beam 32d. Because all the light beams are directed in one direction only as the bounce within the wedge-shaped piece towards the short end surfaces, the light intensity in that direction increases. In general, the longer the surfaces 12, 14 are the higher intensity of the emitted light. However, if the surfaces 12, 14 are very ling, the dampening factor takes over and the light intensity does not increase anymore. This is also one reason why the intensity of the light is less in the upward and downward direction because the pieces are thin in those directions. Similar, a light beam 34a may bounce between the inner surfaces 26 and 28 because the monochrome light beams 34b, 34c and 34d enter the inner surfaces 26, 28 at angles that are different from the angle that is permitted to penetrate the surfaces. The light beams will bounce between the inner walls until the light beams hit the short end at the perpendicular angle and penetrates through the short end surfaces. Some light beams may leak out through the surfaces 12 and 14 if they happen to be perpendicularly (or close thereto) transmitted towards the surfaces 12, 14. However, the intensity of these leaking light beams is low since the pieces are relatively thin.

Figure 3:
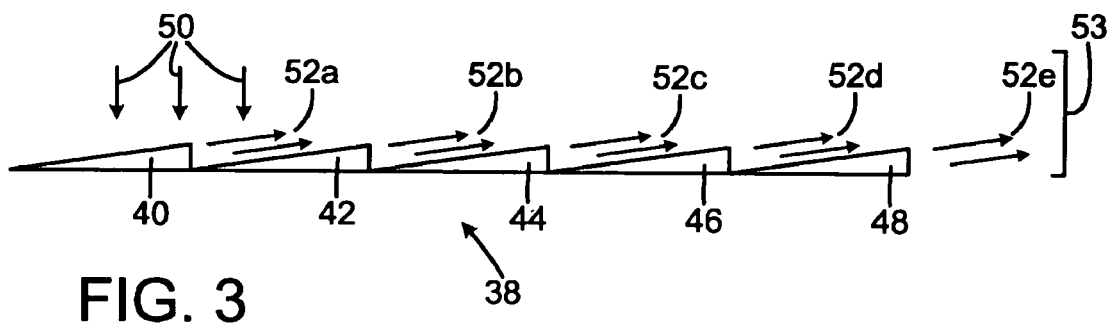
FIG. 3 is a side view of a plurality of fluorescent pieces arranged in a sequence.

FIG. 3 shows a multiple piece arrangement 38 that includes a plurality of sequentially placed pieces 40, 42, 44, 46, 48 that are identical to the piece 10 described above so that the arrangement 38 preferably forms an integral sheet of the pieces 40-48. The incoming light beams 50 from above the arrangement 38 are then directed towards the short end surfaces of each piece and transmitted therethrough as described above and shown by the arrows 52 that provide light in a conical area covering from 0-15° from the horizontal plane. One important feature is that the combination of the emitted light beams, as shown by the arrows 52a-52e, creates an illuminated continuous surface area 53. The strongest intensity of the emitted light is accomplished when all the sides are surrounded by air. It may be possible to attach the arrangement 38 to a sheet in order to dampen the light emitted. The use of the sheet is described below.

Figure 4:
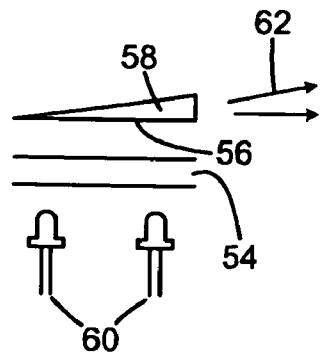
FIG. 4 is a side view of an alternative embodiment of the fluorescent piece of the present invention.

As best seen in FIG. 4, it is also possible to use a reflective sheet 54 attached to the bottom surface 56 of a wedge-shaped piece 58. The sheet may be designed to allow light from a light source 60 to penetrate the sheet 54 into the piece 58 that is identical to the piece 10. Preferably, the light source 60 emits blue light or ultraviolet light because blue or ultraviolet light provides the strongest luminance and thus requires less power. The sheet 54 reflects back any light emitted from the piece 58 so that the sheet may be a reflecting detuser that diffuses the light coming in from the light source 60 below. The light may then be directed and emitted from the piece 58, as shown by the arrows 62.

One example of a suitable application of the embodiment shown in FIG. 3 is to use the arrangement 38 as a lamp that emits the monochrome light in the direction shown by the arrows 52. Another example of a suitable application is to use the fluorescent piece on the barrel of fire-arms or bow devices to be part of the sight mechanism thereof. Thanks to the illuminated sight mechanism, the user may simply point at the target without requiring much of the conventional and time-consuming aiming because the eye can indirectly see the illuminated sight mechanism so that the user can focus more attention on the target without having to focus on the sight mechanism of the weapon. This means the user may be able to accurately shoot in a quicker way which, for example, is important when hunting or when shooting at a moving target. The pieces of the present invention may also be used in traffic applications such as reflective paint or on traffic signs. For example, it may be possible to expose the piece to use ultraviolet light in the dark that in turn emits a red light towards the viewer. Other suitable applications may also use the reflective piece of the present invention.

While the present invention has been described in accordance with preferred compositions and embodiments, it is to be understood that certain substitutions and alterations may be made thereto without departing from the spirit and scope of the following claims.

The invention claimed is:

1. A method for modifying a directing light in a fluorescent piece, comprising:
providing sequentially placed wedge-shaped pieces so that a first piece is adjacent to a second piece that is adjacent to a third piece to form a multiple-piece arrangement, each piece having a base surface and a sloping top surface, the base surface and the top surface having a first pointed end at one end and a short-end surface at a second opposite end thereof, the pieces having a plurality of fluorescent particles disposed therein, the base surface, the top surface and the short-end surface of each piece being constructed of a material that only permits light beams from inside to pass therethrough when the light beams are transmitted at a perpendicular angle relative to the base surface, the top surface or the end surface;
exposing the top surfaces of the pieces to light beams from above the arrangement;
the light beams penetrating the top surfaces and hitting the fluorescent particles;
in response to the light beams, the fluorescent particles emitting monochrome light beams;
the monochrome light beams hitting an inside surface of the top surface at an angle other than a perpendicular angle;
the monochrome light be reflecting off the inside surface of the top surface as reflecting monochrome light beams;
the reflecting monochrome light beams being directed towards the short-end surface and hitting the inside surface of the short-end surface at the perpendicular angle and penetrating through the short-end surface as emitting monochrome light beams so that a combination of the emitting monochrome light beams forms a continuous illuminated surface in one direction only through the short-end surface.

2. The method according to claim 1 wherein the method further comprises the step of placing all the short end surfaces in a first direction.

3. The method according to claim 1 wherein the method further comprises the step of an inner surface of the base surface reflecting light beams.

4. The method according to claim 1 wherein. the method further comprises the step of extending a length of the base surface and the top surface to increase an intensity of the emitted monochrome light beams.

5. The method according to claim 1 wherein the method further comprises the step of attaching a sheet to the multiple-piece arrangement.

6. The method according to claim 5 wherein the method further comprises the step of exposing the sheet to a light from a light source placed below the sheet.

7. The method according to claim 1 wherein the method further comprises the step of a light from a light source penetrating through the sheet and into the multiple-piece arrangement.

8. The method according to claim 7 wherein the method further comprises the step of the sheet reflecting light beams emitted from the multiple-piece arrangement.

* * * * *